(12) United States Patent
Isami

(10) Patent No.: US 9,612,467 B2
(45) Date of Patent: Apr. 4, 2017

(54) LIQUID CRYSTAL DISPLAY DEVICE

(71) Applicant: Japan Display Inc., Tokyo (JP)

(72) Inventor: Hironobu Isami, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/946,346

(22) Filed: Nov. 19, 2015

(65) Prior Publication Data

US 2016/0147098 A1 May 26, 2016

(30) Foreign Application Priority Data

Nov. 20, 2014 (JP) .................................. 2014-235583

(51) Int. Cl.
*G02F 1/1333* (2006.01)
*G02F 1/1345* (2006.01)

(52) U.S. Cl.
CPC .... *G02F 1/133308* (2013.01); *G02F 1/13452* (2013.01); *G02F 2001/133317* (2013.01)

(58) Field of Classification Search
CPC .............................. G02F 1/1333; G02F 1/1345
See application file for complete search history.

(56) References Cited

U.S. PATENT DOCUMENTS

| | | | |
|---|---|---|---|
| 2014/0177147 A1 | 6/2014 | Teramoto | |
| 2016/0085349 A1* | 3/2016 | Oohira | G02F 1/13338 345/173 |
| 2016/0154271 A1* | 6/2016 | Kim | G02F 1/133308 349/58 |
| 2016/0202587 A1* | 7/2016 | Jung | G02B 6/0083 349/43 |
| 2016/0209582 A1* | 7/2016 | Kawata | G02B 6/0028 |
| 2016/0227646 A1* | 8/2016 | Park | H05K 7/02 |
| 2016/0293870 A1* | 10/2016 | Nakagawa | H01L 51/0097 |
| 2016/0306218 A1* | 10/2016 | Onishi | G02F 1/134336 |
| 2016/0327827 A1* | 11/2016 | Yun | G02F 1/133308 |

FOREIGN PATENT DOCUMENTS

JP 2014-126630 A 7/2014

* cited by examiner

*Primary Examiner* — Timothy L Rude
(74) *Attorney, Agent, or Firm* — Typha IP LLC

(57) ABSTRACT

A liquid crystal display device has features that a plurality of flexible wiring substrates is connected in parallel to a first side of a liquid crystal display panel, and a plurality of flexible wiring substrates is connected in parallel to a second side opposite the first side, that on a first side of a mold, a first hole for accommodating the plurality of flexible wiring substrates is formed in a top surface of the mold at place corresponding to the first side of the liquid crystal display panel, and that on a second side of the mold that is opposite from the first side thereof, a second mold part is combined with the mold so that the mold and the second mold part jointly form a second hole for accommodating the plurality of flexible wiring substrates connected to the second side of the liquid crystal display panel.

10 Claims, 17 Drawing Sheets

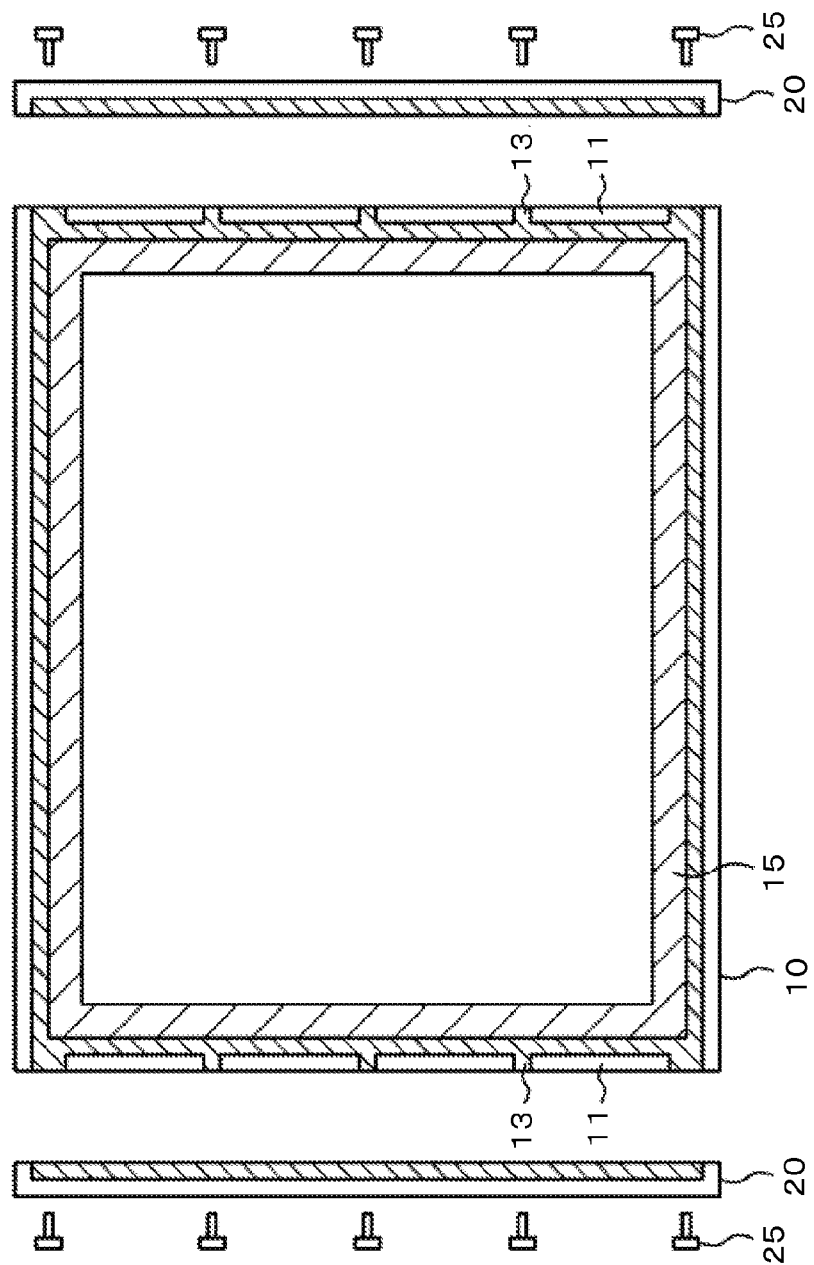

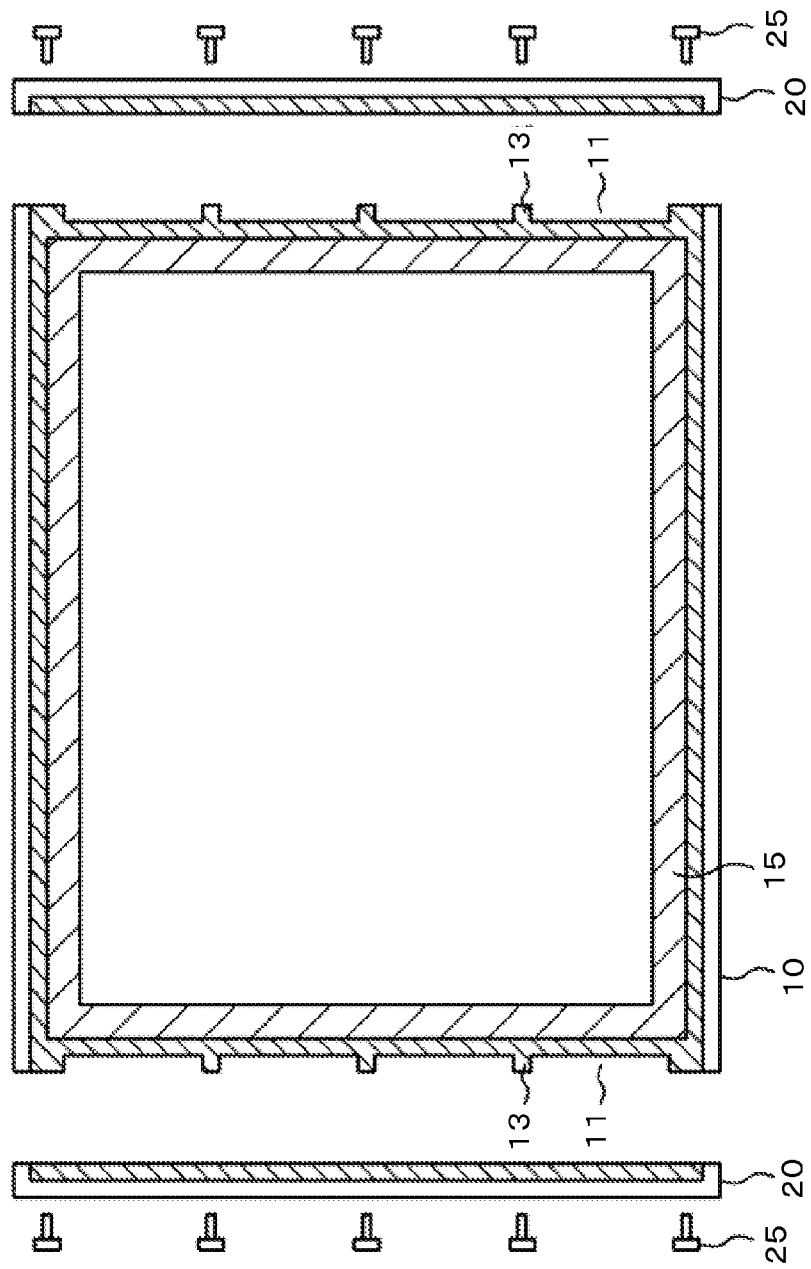

LIQUID CRYSTAL DISPLAY DEVICE

CLAIM OF PRIORITY

The present application claims priority from Japanese Patent Application JP 2014-235583 filed on Nov. 20, 2014, the content of which is hereby incorporated by reference into this application.

BACKGROUND OF THE INVENTION (1) Field of the Invention

The present invention relates to a display device and more particularly to a liquid crystal display device for monitoring which is reduced in frame region.

(2) Description of the Related Art

The liquid crystal display device has a structure which includes : a TFT substrate where pixel electrodes, thin film transistors (TFTs) and the like are arranged in a matrix form; a counter substrate opposed to the TFT substrate; and liquid crystal sandwiched between the TFT substrate and the counter substrate. The display device forms an image by controlling transmittance of light through the liquid crystal molecules on a per-pixel basis.

A backlight is disposed on a back side of a liquid crystal display panel because the liquid crystal per se does not emit light. The backlight and the liquid crystal display device are accommodated in a mold formed of a resin and covered all over with a cover formed of a metal or the like. On the other hand, the liquid crystal display panel has a terminal part connected with a so-called COF (Chip On Film), which includes a flexible wiring substrate mounted with an IC chip for control purpose. The existence of the COF constitutes an obstacle to the reduction of outside configuration of the liquid crystal display device.

Japanese Unexamined Patent Application Publication No. 2014-126630 discloses a structure where a recess is formed in a side surface of the mold such that the recess receives the folded COF therein so as to prevent the COF from leading to the enlargement of the outside configuration of the liquid crystal display device.

SUMMARY OF THE INVENTION

As the liquid crystal display device has a larger size or higher definition so as to be increased in the number of wirings, more than one COF is connected to one side of the liquid crystal display panel. In this case, if the liquid crystal display device is limited in the outside dimension, consideration should be given to work efficiency in assembling the liquid crystal display panel into the mold or the like.

The structure disclosed in Japanese Unexamined Patent Application Publication No. 2014-126630 requires the COFs to be accommodated in the side portion of the mold one by one. When there is more than one COF, therefore, there arises the problem of work efficiency. The invention seeks to provide a high-definition liquid crystal display device having more than one COF connected per side of the liquid crystal display panel, which display device is adapted for the reduction of outside configuration and is excellent in assembly work efficiency.

The invention addresses the above problem and features the following specific means.

(1) A liquid crystal display device includes a liquid crystal display panel, and a mold for carrying the liquid crystal display panel thereon, and has a structure wherein a plurality of flexible wiring substrates is connected in parallel to a first side of the liquid crystal display panel, and wherein a hole for accommodating the plurality of flexible wiring substrates is formed in a top surface of the mold at place corresponding to the first side of the liquid crystal display panel.

(2) A liquid crystal display device includes a liquid crystal display panel, and a mold for carrying the liquid crystal display panel thereon, and has a structure wherein a first plurality of flexible wiring substrates is connected in parallel to a first side of the liquid crystal display panel, and a second plurality of flexible wiring substrates is connected in parallel to a second side opposite the first side, wherein on a first side of the mold, a first hole for accommodating the first plurality of flexible wiring substrates is formed in a top surface of the mold at place corresponding to the first side of the liquid crystal display panel, and wherein on a second side of the mold that is opposite from the first side thereof, a second mold part is combined with the mold so that the mold and the second mold part jointly form a second hole for accommodating the second plurality of flexible wiring substrates connected to the second side of the liquid crystal display panel.

(3) A liquid crystal display device includes a liquid crystal display panel, and a mold for carrying the liquid crystal display panel thereon, and has a structure wherein a first plurality of flexible wiring substrates is connected in parallel to a first side of the liquid crystal display panel, and a second plurality of flexible wiring substrates is connected in parallel to a second side opposite the first side, wherein on a first side of the mold, a first mold part is combined with the mold, and the first plurality of flexible wiring substrates connected to the first side of the liquid crystal display panel is accommodated in a first hole formed by the mold and the first mold part, and wherein on a second side of the mold that is opposite from the first side thereof, a second mold part is combined with the mold, and the second plurality of flexible wiring substrates connected to the second side of the liquid crystal display panel is accommodated in a second hole formed by the mold and the second mold part.

BRIEF DESCRIPTION OF THE DRAWINGS

FIG. 21 is a plan view of a mold according to another mode of the third embodiment; and FIG. 22 is a plan view of a mold according to yet another mode of the third embodiment.

DETAILED DESCRIPTION OF THE PREFERRED EMBODIMENTS

The invention will hereinbelow be described in detail with reference to the embodiments thereof.

First Embodiment

Figure 1:
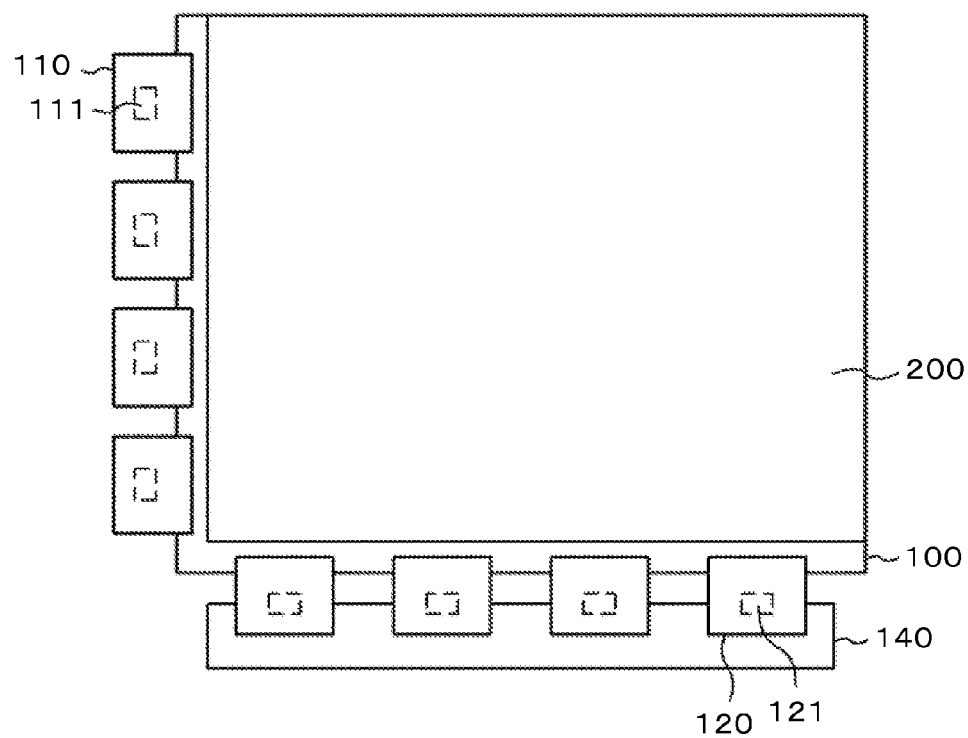
FIG. 1 is a plan view of a liquid crystal display panel.

FIG. 1 is a plan view of a liquid crystal display panel to which the invention is applied. FIG. 1 shows a liquid crystal display panel for use in a medical monitor, a screen of which has, for example, a diagonal diameter of 21 inches and an aspect ratio of 5:4. Because of a requirement of high-definition screen, the medical monitors and the like contain a large number of scanning lines and image signal lines and hence, the number of COFs connected thereto increases accordingly.

Referring to FIG. 1, a counter substrate 200 is disposed on a TFT substrate 100 formed with TFTs, pixel electrodes, scanning lines, image signal lines and the like. Liquid crystal is sandwiched between the TFT substrate 100 and the counter substrate 200. The short side of the TFT substrate 100 is connected with four COFs 110 for driving the scanning lines. These COFs are referred to as gate COFs 110. Mounted to the gate COF 110 is a gate driver 111 for driving the scanning lines. The long side of the TFT substrate 100 is connected with four COFs 120. These COFs are referred to as drain COFs 120. Mounted to the drain COF 120 is a drain driver 121 for driving the image signal lines. The drain COF 120 is further connected to a PCB (Printed Circuit Board) 140 mounted with wirings, an image signal processing circuit and the like.

Since the wiring for interconnecting the gate COFs 110 is formed on the gate COFs 110 and the TFT substrate 100, there is no need for using the wiring on the PCB 140 for interconnecting the gate COFs 110.

Figure 2:
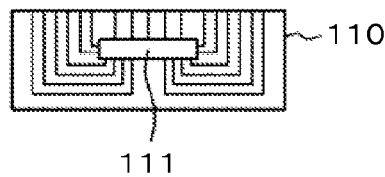
FIG. 2 is a plan view of a gate COF.

FIG. 2 is a plan view of the gate COF 110. The gate COF 110 is mounted with the gate driver 111. As shown in FIG. 2, terminals of the wirings on the gate COF 110 are located only at one side thereof. This is because the scanning lines need be successively scanned as shown in FIG. 1. The signal and source voltage supplied to the gate COF 110 is transmitted from the TFT substrate 100 to the gate driver 111 via the wiring formed on the TFT substrate 100 and the wiring formed on the gate COF 110.

Figure 3:
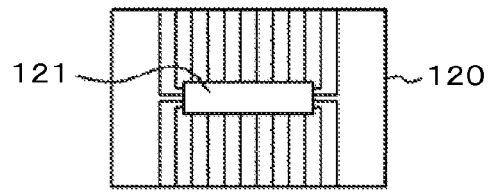
FIG. 3 is a plan view of a drain COF.

FIG. 3 is a plan view of the drain COF 120. The drain COF 120 is mounted with the drain driver 121. As shown in FIG. 3, the drain COF 120 has terminals formed at two opposite sides thereof. The terminals at the upper side are connected to the liquid crystal display panel while the terminals at the lower side are connected to the PCB 140, for example.

Figure 4:
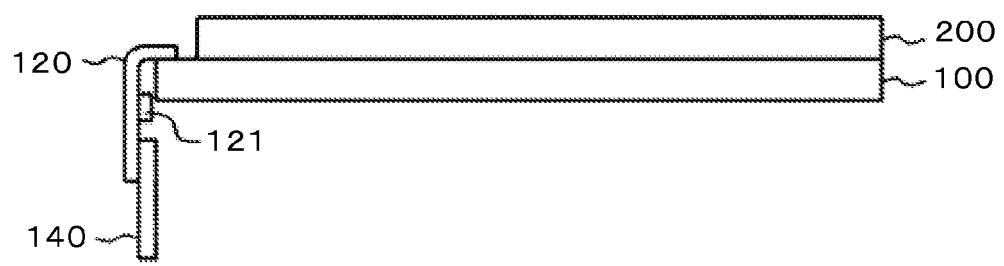
FIG. 4 is a sectional view showing connection of the drain COF.

As shown in FIG. 1, the COFs 110, 120 extend sideways. In this arrangement, the liquid crystal display device has a large outside configuration. By the way, as shown in FIG. 1, the plural drain COFs 120 are connected to one side of the liquid crystal display panel and are also connected to the PCB 140. Therefore, the plural drain COFs 120 are unified by the PCB 140. Then, the plural drain COFs 120 can be easily bent, as shown in FIG. 4, so as to be conformed to a side surface or a back surface of the monitor.

Figure 5:
FIG. 5 is a sectional view showing connection of the gate COF.

However, the plural gate COFs 110 connected to one side of the liquid crystal display panel cannot be unified and hence, extend horizontally, as shown in FIG. 5. In this arrangement, the liquid crystal display device has an enlarged outside configuration. It is therefore necessary to bend the gate COFs 110 laterally. However, there are plural gate COFs 110 and an operation of bending and inserting the individual gate COFs 110 in a predetermined recess or the like is cumbersome.

Figure 6:
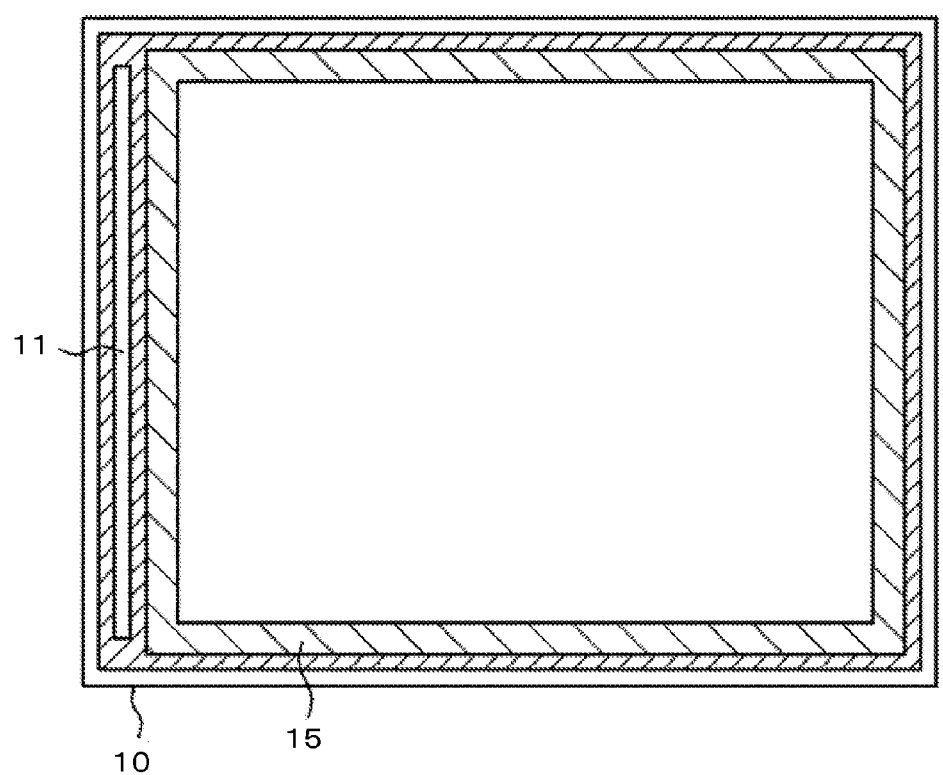
FIG. 6 is a plan view of a mold according to a first embodiment.

FIG. 6 is a plan view of a mold 10 according to the first embodiment. The mold 10 has a frame-like configuration and is formed with a step 15 on inner sides thereof. The liquid crystal display panel is placed on this step. A feature of the mold 10 of this embodiment is that the mold is formed with an elongated hole 11 in a grooved side thereof extended along the side of the liquid crystal display panel shown in FIG. 1, which side is connected with the gate COFs 110. That is, the mold is adapted to accommodate the gate COFs 110 in this hole.

Figure 7:
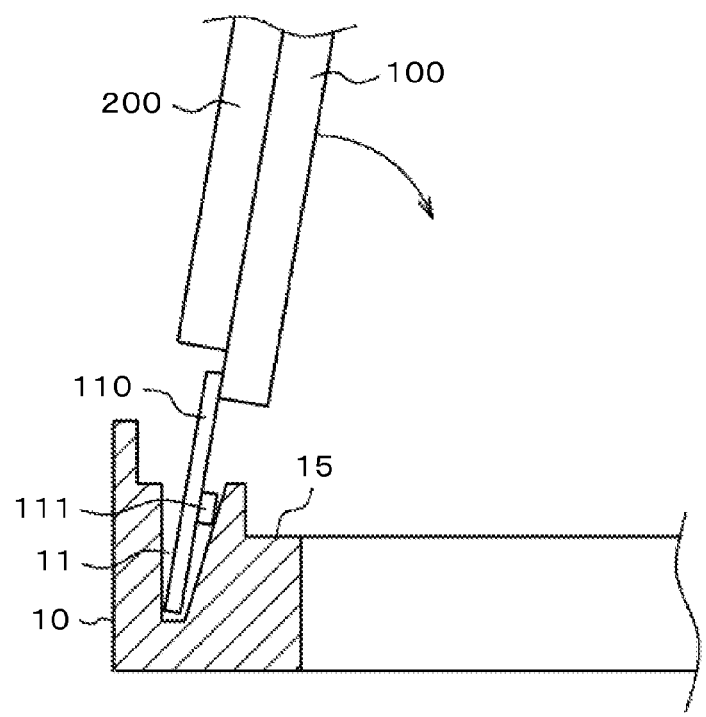
FIG. 7 is a schematic diagram showing an assembly of a liquid crystal display panel and a mold according to the first embodiment.

FIG. 7 is a schematic sectional view showing a step of an assembly work of the liquid crystal display panel and the mold 10 according to the first embodiment. Referring to FIG. 7, the gate COFs 110 connected to the liquid crystal display panel are inserted in the hole 11 of the mold 10. The hole 11 is elongated and hence, is capable of receiving the plural gate COFs 110 therein at a time. Subsequently, the liquid crystal display panel is lowered in the direction of the arrow and placed on the step 15 of the mold 10.

Figure 8:
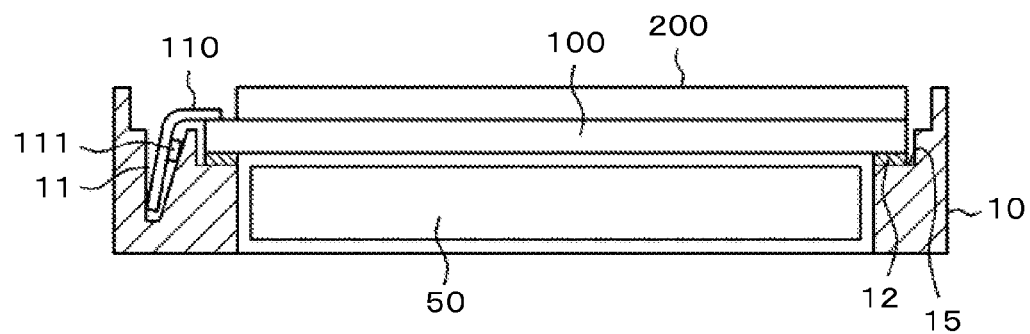
FIG. 8 is a sectional view showing a structure of the first embodiment.

FIG. 8 is a sectional view showing the liquid crystal display panel accommodated in the mold 10. While the liquid crystal display panel is placed on the step 15 of the mold 10, a light shielding adhesive tape 12 is interposed between the step 15 of the mold 10 and the TFT substrate 100 of the liquid crystal display panel so as to prevent the liquid crystal display panel from disengaging from the mold. As shown in FIG. 8, the gate COFs 110 are accommodated in the hole 11 formed in the mold 10 so as to be prevented from leading to the enlargement of the outside configuration of the liquid crystal display device.

The feature of this embodiment consists in that the assembly as shown in FIG. 8 can be completed simply by placing the liquid crystal display panel on the mold 10 while the operation of bending the plural gate COFs 110 and the operation of inserting the gate COFs in the recess one by one are obviated. Therefore, the embodiment can achieve a notable reduction of work cost.

Referring to FIG. 8, a backlight 50 is disposed on a back side of the liquid crystal display panel in the mold 10. The backlight 50 includes optical parts such LEDs or the like as a light source, light guide plate, reflection sheet, diffuser sheet and prism sheet, the details of which are dispensed with. Further referring to FIG. 8, the hole 11 formed in the mold 10 is closed at bottom. This prevents the invasion of foreign substances into the mold 10.

Figure 9:
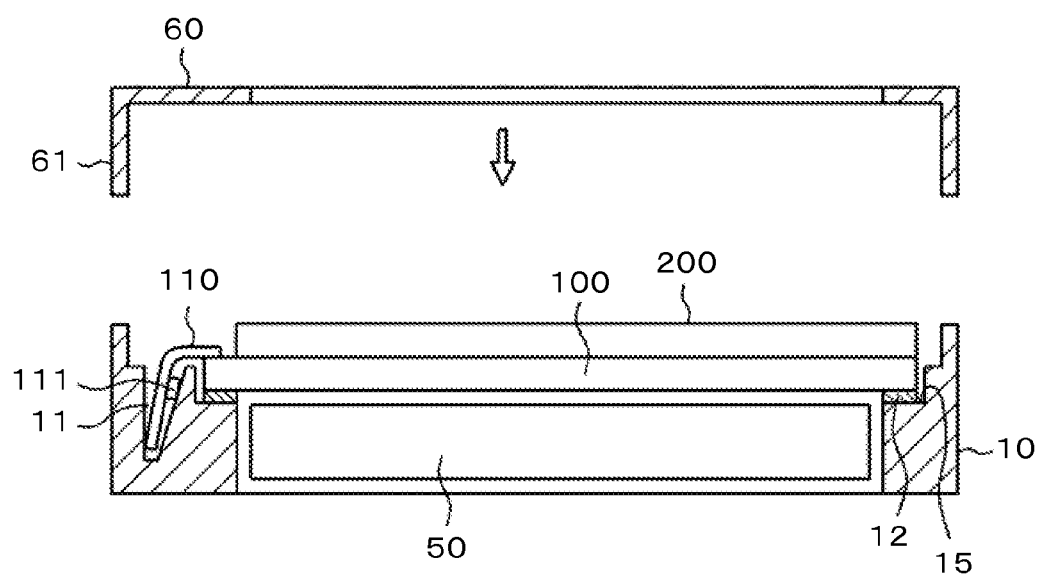
FIG. 9 is a sectional view showing an upper cover being mounted on the structure of the first embodiment.

FIG. 9 is a sectional view showing how a top cover 60 formed of a metal or the like is applied from above to cover the mold 10, shown in FIG. 8, which accommodates the liquid crystal display panel and the backlight 50 therein. Referring to FIG. 9, the gate COFs 110 are already accommodated in the mold 10, thus obviating a problem that the gate COF 110 or the gate driver 11 gets caught by a flange 61 of the top cover 60 and broken.

According to the above description, the hole 11 exists only on one side of the mold 10. However, in a case where the plural gate COFs 110 are connected to opposite sides of the liquid crystal display panel, a similar hole 11 may also be formed on the corresponding side of the mold 10 so that the plural gate COFs 110 on the opposite sides of the liquid crystal display panel can be accommodated in the holes 11. It is noted in this case that when the liquid crystal display panel is placed on the mold 10, it is necessary to take a step of inserting the gate COFs on the opposite sides of the liquid crystal display panel in the corresponding holes 11 of the mold 10 as holding down the gate COFs 110.

Second Embodiment

Figure 10A:
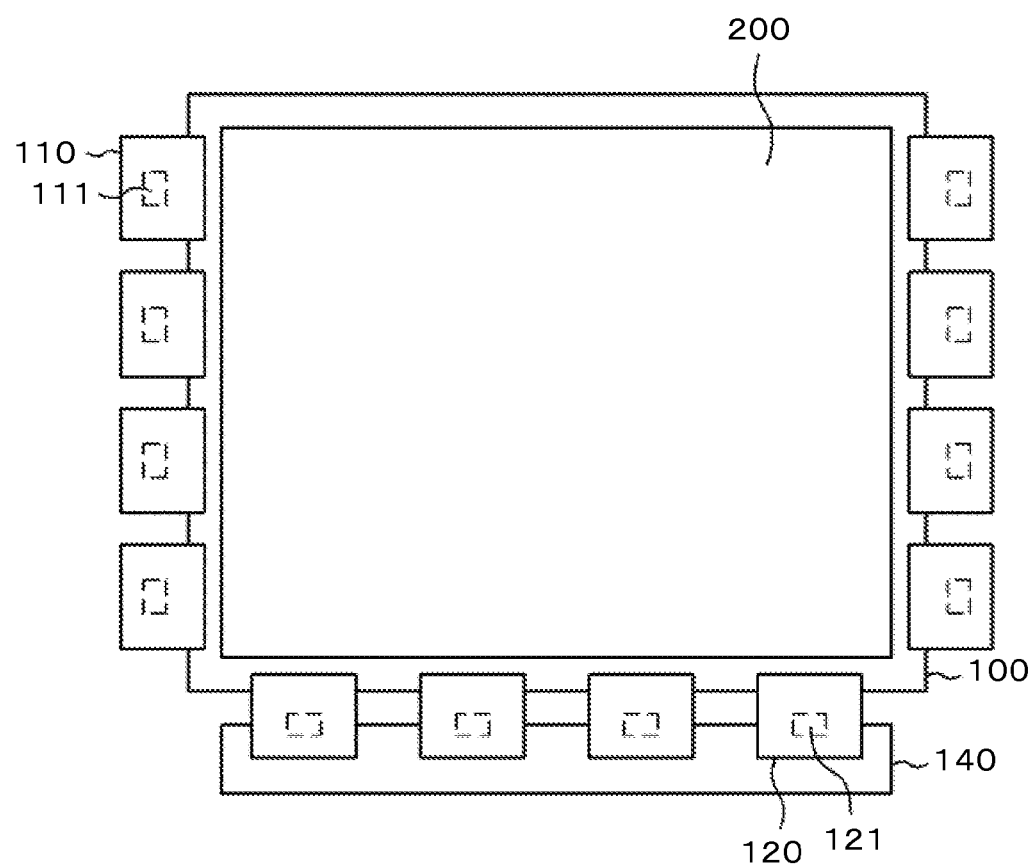
FIG. 10A is a plan view of a liquid crystal display panel according to a second embodiment.

FIG. 10A is a plan view showing a liquid crystal display panel in a case where the liquid crystal display device has higher definition. As the screen has the higher definition, the number of scanning lines increases, which dictates the need for arranging the gate COFs 110 on two sides of the liquid crystal display panel. Referring to FIG. 10A, the plural gate COFs 110 are formed on the opposite sides of the liquid crystal display panel. FIG. 10A shows the numbers of the gate COFs 110 and the drain COFs 120 merely by way of example. In the case of a product having a screen which has a diagonal diameter of 21 inches and an aspect ratio of 5:4, the product often includes six gate COFs 110 on either side or twelve gate COFs in total, and eleven drain COFs.

Figure 10B:
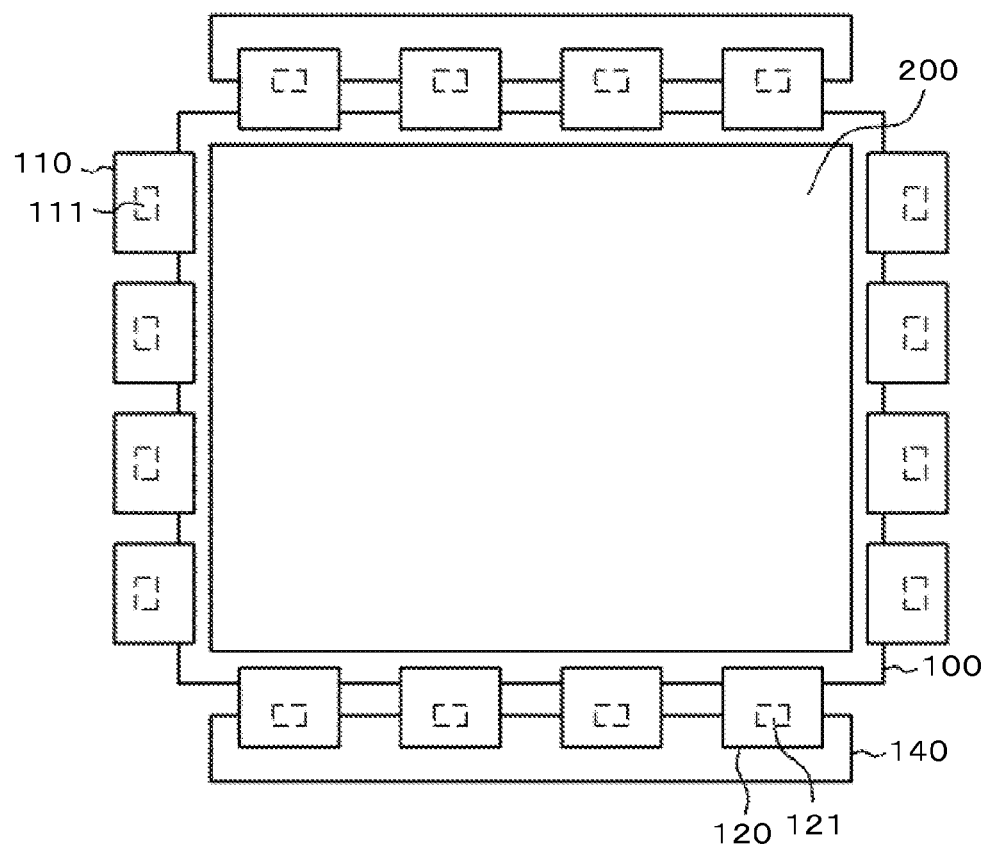
FIG. 10B is a plan view showing another liquid crystal display panel according to the second embodiment.

FIG. 10B is a plan view showing a liquid crystal display panel in a case where the liquid crystal display device has an even higher definition. Referring to FIG. 10B, not only the gate COFs 110 but also the drain COFs 120 are arranged on the opposite sides. Except for this, the liquid crystal display panels of FIG. 10A and FIG. 10B have the same configuration as that illustrated in FIG. 1. In the configurations shown in FIG. 10A and FIG. 10B, the drain COFs 120 are also unified by the PCB 140 at distal ends thereof. Therefore, the operation of accommodating the liquid crystal display panel in the mold 10 does not suffer the decrease in work efficiency, as described in the first embodiment.

In the case of the gate COF 110, on the other hand, the problem of work efficiency arises because the plural gate COFs 110 are not unified. If the mold 10 of the first embodiment is used, the gate COFs 110 on the one side of the liquid crystal display panel can be easily accommodated in the hole 11 of the mold 10 as described with reference to the first embodiment. However, the gate COF 110 connected to the other end of the liquid crystal display panel, as enclosed by the dotted line in the figure, is problematic.

Figure 11:
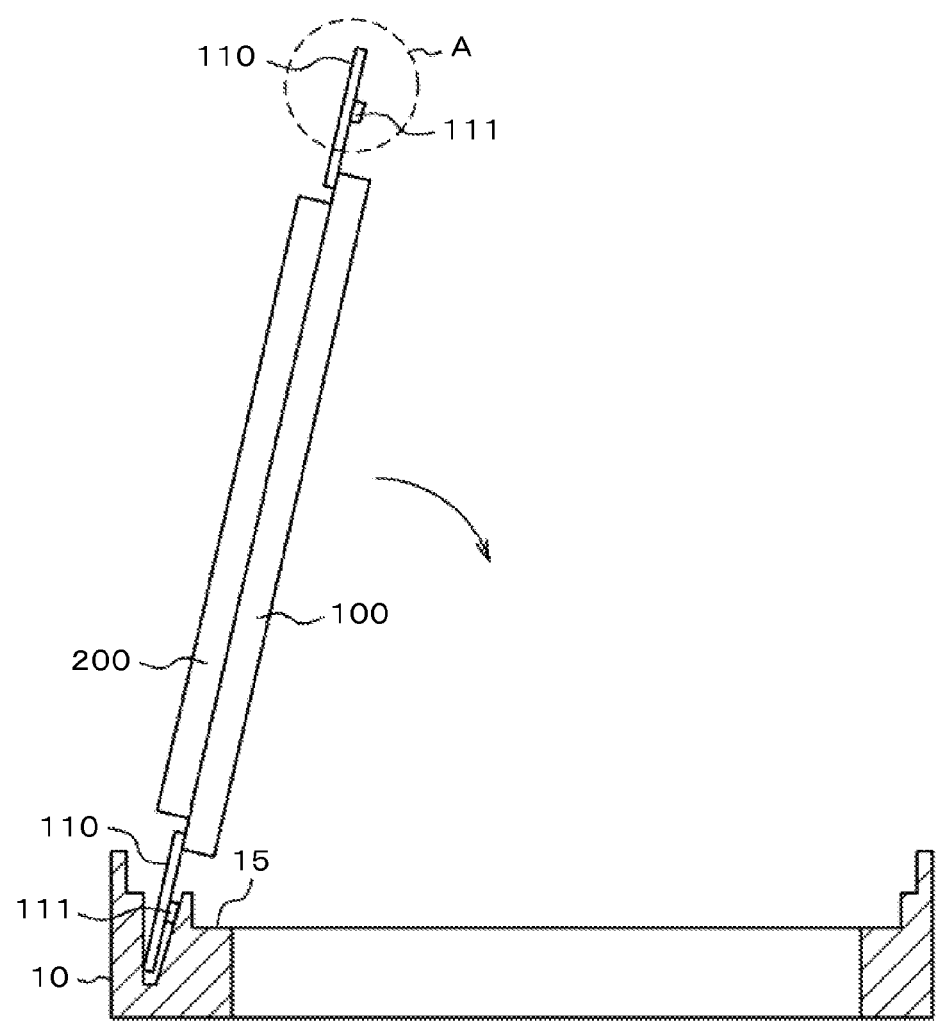
FIG. 11 is a schematic sectional view showing a problem in assembling the liquid crystal display panel of FIG. 10 in the mold.

As described in the last paragraph of the first embodiment, it is also possible to form the hole, such as illustrated by the first embodiment, at the other end of the mold 10. Although the sectional view of FIG. 11 illustrates one gate COF 110, there is actually more than one gate COFs as shown in FIG. 10. The following problem is encountered when the operation as illustrated in FIG. 11 is performed to accommodate the plural gate COFs 110 on the A-side in the hole formed at the other end of the mold 10. It is not an easy job to place the liquid crystal display panel on the mold because the job involves an operation of inserting the plural gate COFs in the hole as holding down the gate COFs.

Figure 12:
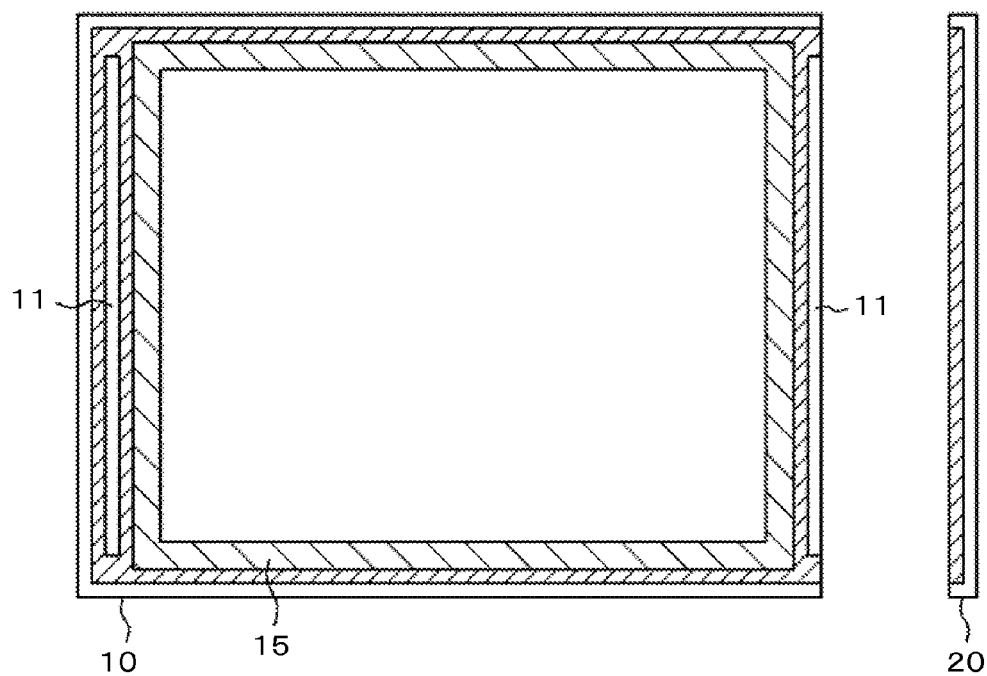
FIG. 12 is a plan view of a mold of the second embodiment.

FIG. 12 is a plan view showing a mold 10 according to this embodiment . Referring to FIG. 12, the mold 10 is divided into a mold 10 as the main body and a second mold part 20 defining the right-hand frame. When the second mold part 20 is assembled to the mold 10, the hole 11 for accommodating the gate COFs 110 is also formed at the right side of the mold 10. The left side of the mold 10 as seen in FIG. 12 is configured the same way as that of the first embodiment.

Figure 13:
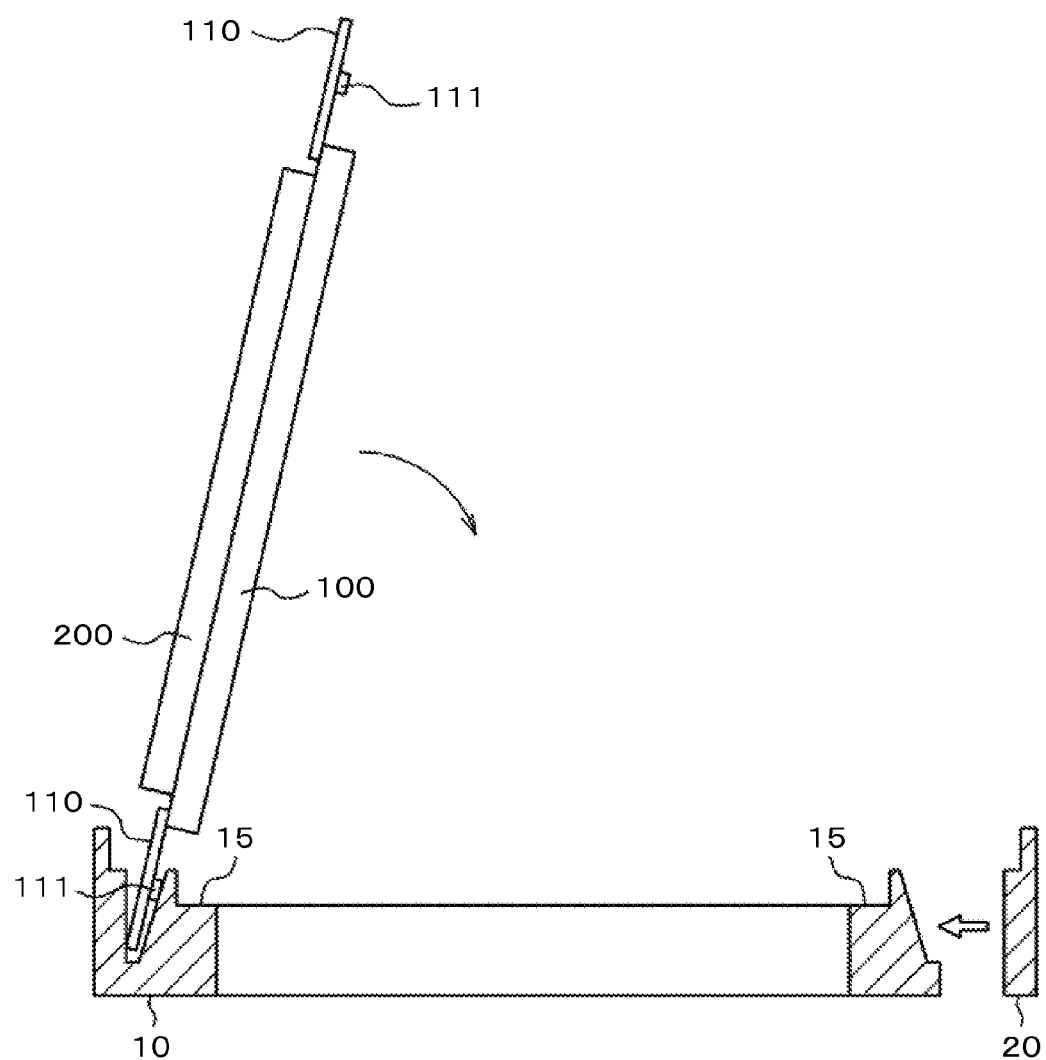
FIG. 13 is a schematic diagram showing a step of working process of the second embodiment.

FIG. 13 is a schematic sectional view showing a step of assembling the liquid crystal display panel and the mold 10 according to this embodiment. Referring to FIG. 13, the plural gate COFs 110 connected to the one side of the liquid crystal display panel are first inserted in the hole 11 of the mold 10 the same way as in the first embodiment. Subsequently, the liquid crystal display panel is lowered in the direction of the arrow so as to place the liquid crystal display panel on the step 15 of the mold 10. Subsequently, a side of the mold 10 is closed with the second mold part 20.

Figure 14:
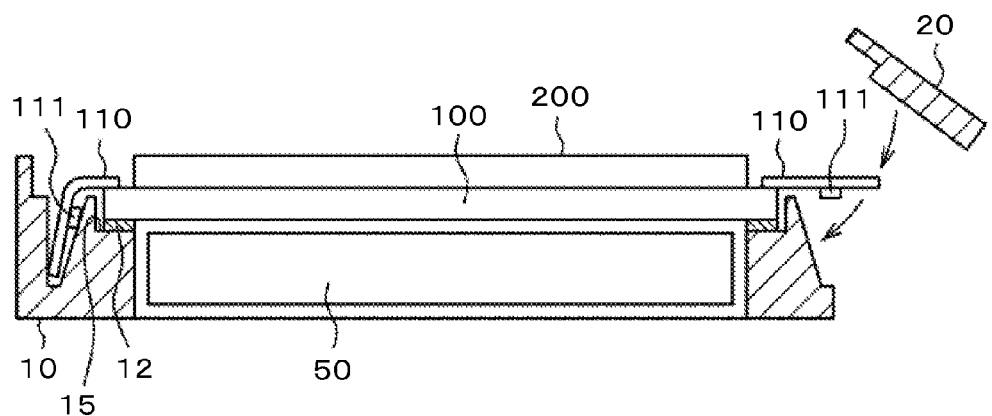
FIG. 14 is a schematic diagram showing another step of working process of the second embodiment.

FIG. 14 is a schematic sectional view showing an operation where after the liquid crystal display panel is placed on the step 15 of the mold 10, the gate COFs 110 are accommodated in the hole 11 of the mold 10 while closing the end of the mold 10 with the second mold part 20. Specifically, the second mold part 20 is moved down from diagonally above the gate COFs 110 as holding down the gate COFs 110, and combined with the lateral side of the mold. Thus, the gate COFs 110 are automatically accommodated in the hole 11 formed when the mold 10 and the second mold part 20 are combined together.

Figure 15:
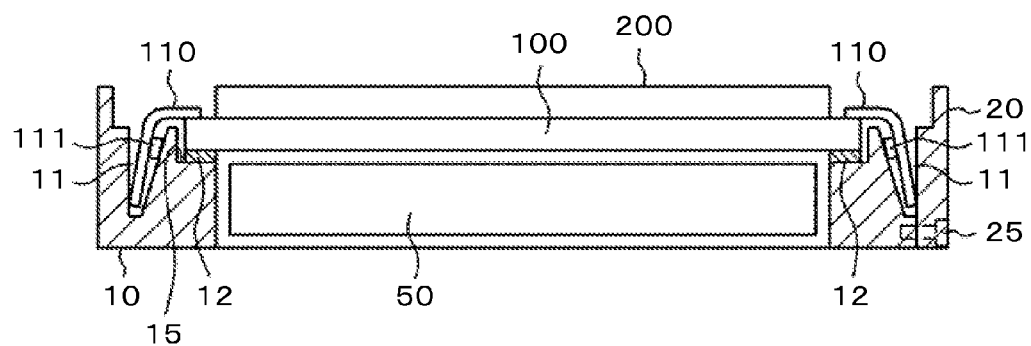
FIG. 15 is a sectional view showing a structure of the second embodiment.

FIG. 15 is a sectional view showing the above-described state. Referring to FIG. 15, the gate COFs 110 are accommodated in the hole 11 formed between the mold 10 and the second mold part 20. Referring to FIG. 15, the mold 10 and the second mold part 20 are combined together with a screw 25 at bottoms thereof. The screw 25 is an example of connecting method and a simple connecting method such as caulking may be employed, for example. Subsequently, the top cover 60 is applied from above to cover the mold 10 the same way as shown in FIG. 9.

Figure 16:
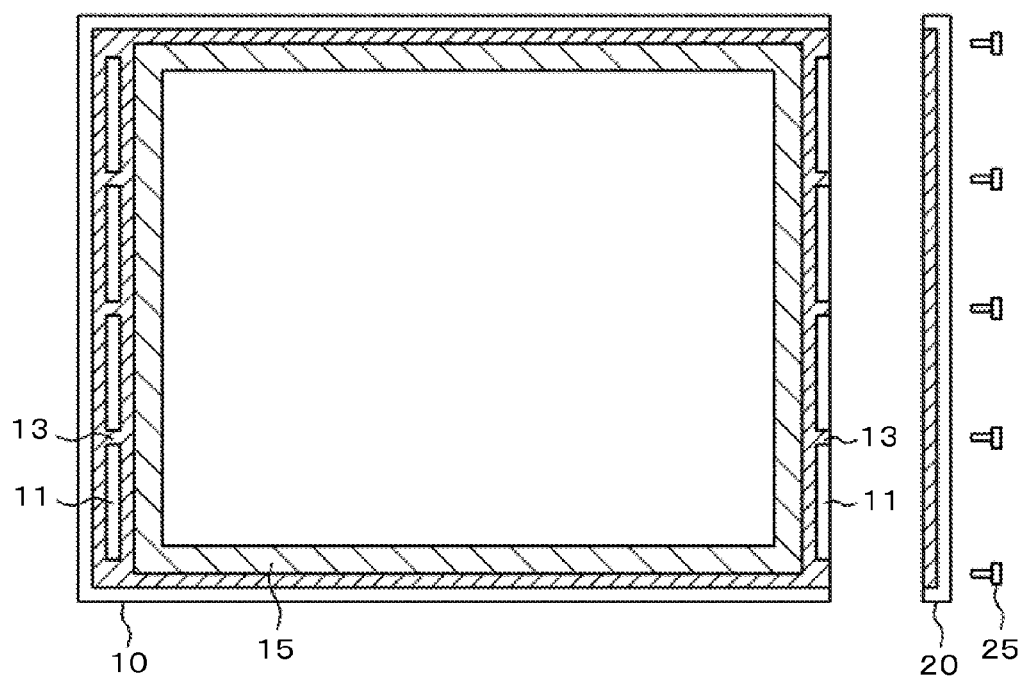
FIG. 16 is a plan view of a mold according to another mode of the second embodiment.

FIG. 16 is a plan view showing the mold 10 according to a second mode of this embodiment. A feature of the mold shown in FIG. 16 is that the hole 11 for accommodating the gate COFs 110 is not a single hole body but one independently provided for each of the gate COFs 110. Specifically, a bridge 13 exists between the holes. On the right side as seen in FIG. 16, the bridges 13 of the mold 10 make contact with the second mold part 20. At this contact area, the mold 10 and the second mold part 20 can be combined together with the screw or the like. Therefore, freedom in connection between the mold 10 and the second mold part 20 can be increased.

Figure 17:
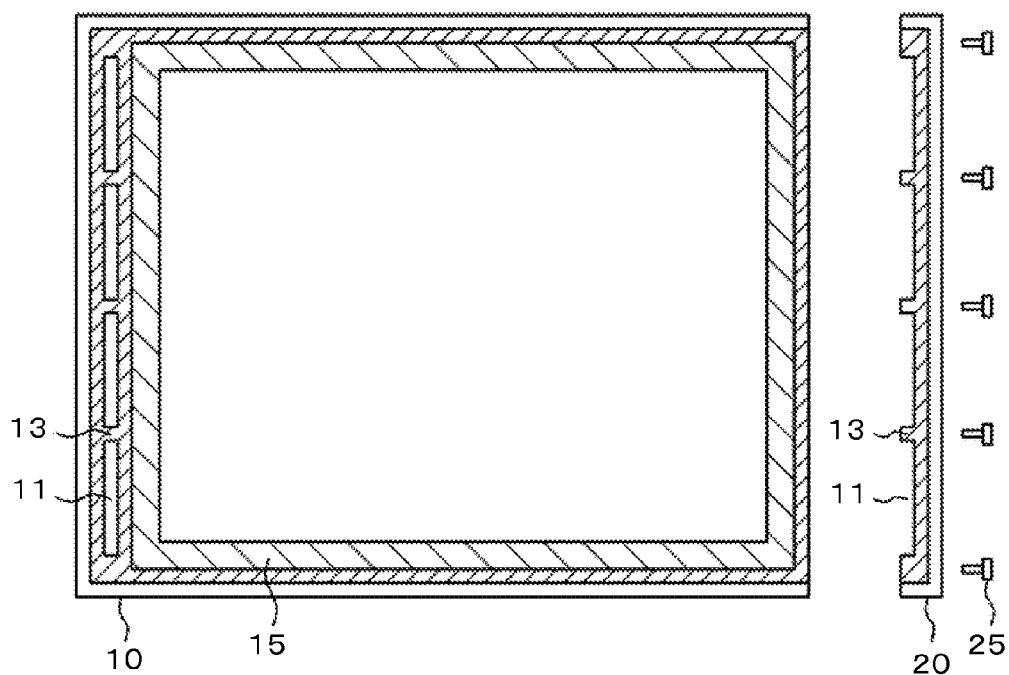
FIG. 17 is a plan view of a mold according to yet another mode of the second embodiment.

FIG. 17 is a plan view showing a mold 10 according to a third mode of this embodiment. FIG. 17 shows the same feature as that of FIG. 16 in that the hole 11 for accommodating the gate COFs 110 is not a single hole body but one independently provided for each of the gate COFs 110 and that the bridge 13 exists between the holes. A feature of the mold shown in FIG. 17 is that the hole 11 formed in the mold 10 extends therethrough or from a top surface to an under surface thereof. Despite the holes 11 extending through the mold, the mold 10 and the second mold part 20 can be combined together by means of the bridges 13. Such a through-hole 11 is useful in a case where it is desired to extend any of the gate COFs 110 to a back side of the mold 10. As seen in FIG. 17, the bridges 13 are formed on the second mold part 20. Both the mold 10 and the second mold part 20 can be formed with the bridge 13.

Third Embodiment

Figure 18:
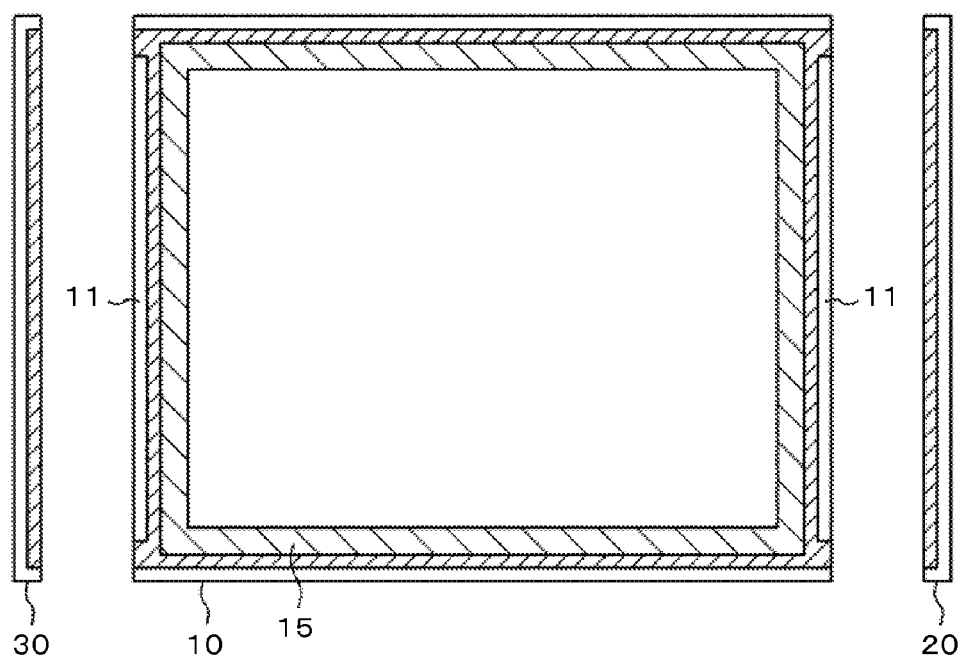
FIG. 18 is a plan view of a mold according to a third embodiment.

FIG. 18 is a plan view showing a mold 10 according to a third embodiment of the invention. According to this embodiment, the mold consists of a mold body 10, the second mold part 20, and a third mold part 30. Referring to FIG. 18, the right side of the mold 10 is configured the same way as that of the second embodiment shown in FIG. 13. A feature of the mold 10 of this embodiment is that similarly to the right side of the mold 10, the left side of the mold 10 is also combined with the third mold part 30 to form the hole 11, as shown in FIG. 18.

Figure 19:
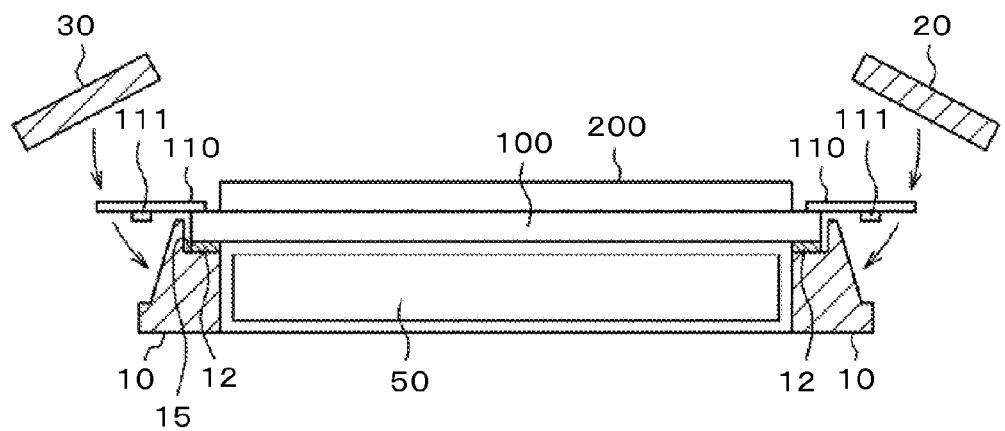
FIG. 19 is a schematic diagram showing a step of working process of the third embodiment.

FIG. 19 is a schematic sectional view showing a step of an assembly work of the liquid crystal display panel and the mold 10 according to this embodiment. Referring to FIG. 19, the liquid crystal display panel is placed on the step 15 of the mold 10 with the light shielding tape 12 interposed therebetween. In this state, the gate COFs 110 extend horizontally. The third mold part 30 and the second mold part 20 constituting the left side and the right side of the mold 10 are moved down from diagonally left and right above the gate COFs 110 to be combined with the mold 10 while holding down the gate COFs 110.

Figure 20:
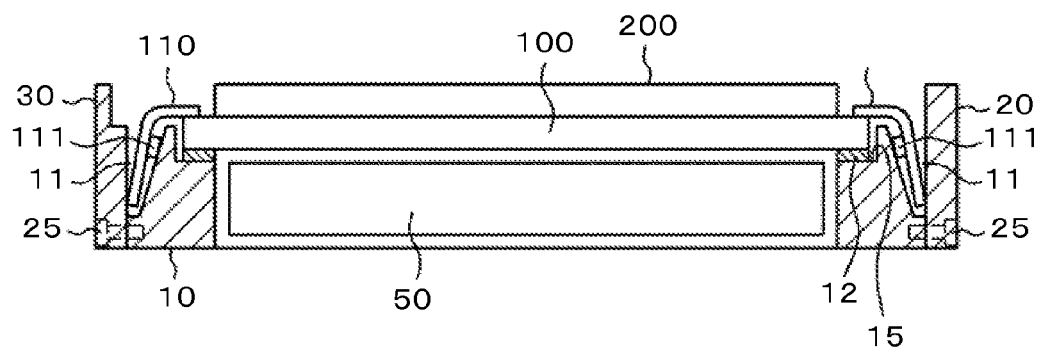
FIG. 20 is a sectional view showing a structure of the third embodiment.

At this time, the gate COFs 110, the gate drivers 111 and the like are automatically accommodated in the holes formed. Subsequently, the mold 10 is combined with the second mold part 20 and the third mold part 30 with the screws 25. FIG. 20 is a sectional view showing this state of this embodiment. It is noted that the screw 25 is an example of connecting method and a simple connecting method such as caulking may be employed, for example. Subsequently, the mold 10 is covered with the top cover 60 such as shown in FIG. 9, just as in the other embodiments.

FIG. 21 is a plan view showing a mold 10 according to another mode of this embodiment. Referring to FIG. 21, the hole 11 formed on either side of the mold 10 is not a single hole body but one independently provided for each of the gate COFs 110. The individual holes 11 are defined by the bridges 13. Such a configuration permits the mold 10 to be combined with the second mold part 20 and the third mold part 30 byway of the bridges 13. Therefore, the freedom in connection can be increased.

FIG. 22 is a plan view showing a mold 10 according to yet another mode of this embodiment . FIG. 22 differs from FIG. 21 in that the hole 11 formed at the mold 10 extends therethrough or from the top surface to the under surface thereof. Despite the holes 11 extending through the mold, the mold 10 can be combined with the second mold part 20 or the third mold part 30 by means of the bridges 13. Such a through-hole is useful in the case where it is desired to extend any of the gate COFs 110 to the back side of the mold 10.

The above description is made on the assumption that the flexible wiring substrate connected to the liquid crystal display panel is the gate COF. However, the invention is also applicable to a case where the flexible wiring substrate has no chip mounted thereon.

What is claimed is:

1. A liquid crystal display device comprising a liquid crystal display panel, and a mold for carrying the liquid crystal display panel thereon,
    wherein a plurality of flexible wiring substrates is connected in parallel to a first side of the liquid crystal display panel, and
    a hole for accommodating the plurality of flexible wiring substrates is formed in a top surface of the mold at place corresponding to the first side of the liquid crystal display panel.

2. The liquid crystal display device according to claim 1, wherein the hole formed in the mold is closed at bottom.

3. The liquid crystal display device according to claim 1, wherein the hole formed in the mold is formed for each of the plurality of flexible wiring substrates.

4. The liquid crystal display device according to claim 1,
    wherein a second plurality of flexible wiring substrates is connected in parallel to a second side of the liquid crystal display panel that is opposite from the first side thereof, and
    a second hole for accommodating the second plurality of flexible wiring substrates is formed in the top surface of the mold at place corresponding to the second side of the liquid crystal display panel.

5. A liquid crystal display device comprising a liquid crystal display panel, and a mold for carrying the liquid crystal display panel thereon,
    wherein a first plurality of flexible wiring substrates is connected in parallel to a first side of the liquid crystal display panel, and a second plurality of flexible wiring substrates is connected in parallel to a second side opposite the first side,
    on a first side of the mold, a first hole for accommodating the first plurality of flexible wiring substrates is formed in a top surface of the mold at place corresponding to the first side of the liquid crystal display panel, and
    on a second side of the mold that is opposite form the first side thereof, a second mold part is combined with the mold so that the mold and the second mold part jointly form a second hole for accommodating the second plurality of flexible wiring substrates connected to the second side of the liquid crystal display panel.

6. The liquid crystal display device according to claim 5, wherein the second hole is closed at bottom.

7. The liquid crystal display device according to claim 5, wherein the second hole is formed for each of the second plurality of flexible wiring substrates connected to the second side of the liquid crystal display panel.

8. A liquid crystal display device comprising a liquid crystal display panel, and a mold for carrying the liquid crystal display panel thereon,
    wherein a first plurality of flexible wiring substrates is connected in parallel to a first side of the liquid crystal display panel, and a second plurality of flexible wiring substrates is connected in parallel to a second side opposite the first side,
    on a first side of the mold, a first mold part is combined with the mold, and the first plurality of flexible wiring substrates connected to the first side of the liquid crystal display panel is accommodated in a first hole formed by the mold and the first mold part, and
    on a second side of the mold that is opposite from the first side thereof, a second mold part is combined with the mold, and the second plurality of flexible wiring substrates connected to the second side of the liquid crystal display panel is accommodated in a second hole formed by the mold and the second mold part.

9. The liquid crystal display device according to claim 8, wherein the first hole and the second hole are closed at bottom.

10. The liquid crystal display device according to claim 8, wherein the first hole on the first side of the mold is formed for each of the first plurality of flexible wiring substrates connected to the first side of the liquid crystal display panel, while the second hole on the second side of the mold is formed for each of the second plurality of flexible wiring substrates connected to the second side of the liquid crystal display panel.

* * * * *